(12) United States Patent  
Browne

(10) Patent No.: US 8,797,703 B2  
(45) Date of Patent: Aug. 5, 2014

(54) ACTIVE MATERIAL ACTUATOR HAVING A MAGNETORHEOLOGICAL OVERLOAD PROTECTOR

(71) Applicant: GM Global Technology Operations LLC, Detroit, MI (US)

(72) Inventor: Alan L. Browne, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/836,289

(22) Filed: Mar. 15, 2013

(65) Prior Publication Data

US 2013/0240320 A1    Sep. 19, 2013

Related U.S. Application Data

(63) Continuation-in-part of application No. 13/421,828, filed on Mar. 15, 2012.

(51) Int. Cl.
*H01H 47/00* (2006.01)

(52) U.S. Cl.
USPC .......................................................... 361/144

(58) Field of Classification Search
CPC ....... F03G 7/065; F16D 27/00; F16D 27/004; F16D 27/01; F16D 27/02; F16D 37/02; H01H 47/00
USPC .......................................... 361/139, 143, 144
See application file for complete search history.

(56) References Cited

U.S. PATENT DOCUMENTS

| | | | | |
|---|---|---|---|---|
| 7,905,538 | B2* | 3/2011 | Ukpai et al. | 296/146.9 |
| 8,201,850 | B2* | 6/2012 | Browne et al. | 280/801.1 |
| 8,390,305 | B2* | 3/2013 | Herrera et al. | 324/691 |
| 2006/0145544 | A1* | 7/2006 | Browne et al. | 310/12 |
| 2007/0247101 | A1* | 10/2007 | Noda et al. | 318/582 |
| 2008/0272615 | A1* | 11/2008 | McKnight et al. | 296/180.5 |
| 2009/0058130 | A1* | 3/2009 | Ukpai et al. | 296/146.9 |
| 2010/0112924 | A1* | 5/2010 | Alexander et al. | 454/70 |
| 2010/0176581 | A1* | 7/2010 | Usoro et al. | 280/807 |
| 2010/0326070 | A1* | 12/2010 | Hao et al. | 60/527 |
| 2010/0332151 | A1* | 12/2010 | Hao et al. | 702/41 |
| 2011/0114434 | A1* | 5/2011 | Mankame et al. | 192/35 |
| 2013/0240320 | A1* | 9/2013 | Browne | 192/84.9 |
| 2013/0270056 | A1* | 10/2013 | Mankame et al. | 192/84.5 |

* cited by examiner

*Primary Examiner* — Rexford Barnie
*Assistant Examiner* — Christopher Clark

(57) ABSTRACT

A system for and method of providing overload protection for actuators, such as shape memory alloy wires, including and utilizing a magnetorheological fluid mechanism connected in series with or parallel to the load driven by the actuator, and operable to effect tunable protection.

20 Claims, 2 Drawing Sheets

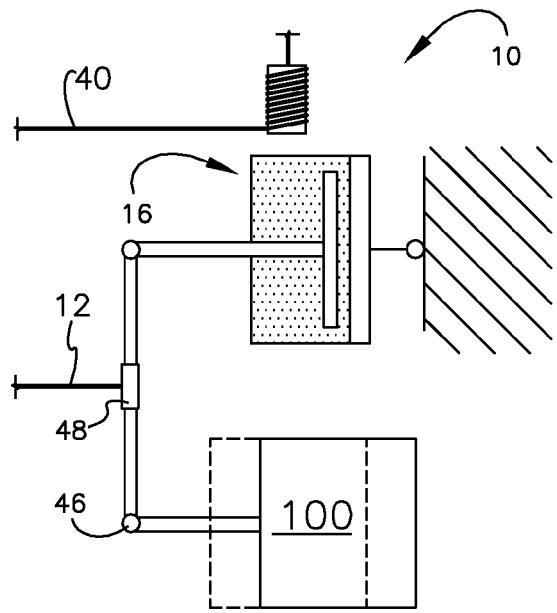
FIG. 2a
FIG. 3
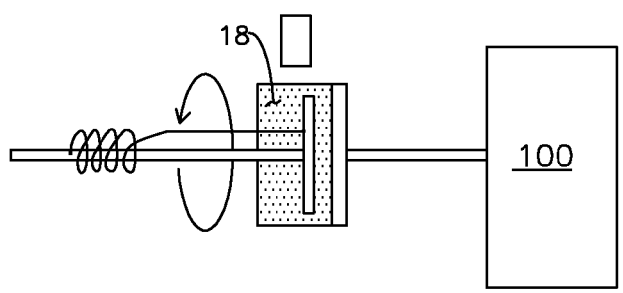
FIG. 3a

ACTIVE MATERIAL ACTUATOR HAVING A MAGNETORHEOLOGICAL OVERLOAD PROTECTOR

CROSS-REFERENCE TO RELATED APPLICATIONS

This application is a continuation-in-part of U.S. patent application Ser. No. 13/421,828, entitled "ACTIVE MATERIAL ACTUATION UTILIZING MAGNETIC OVERLOAD PROTECTION," filed Mar. 15, 2012, which is incorporated by reference herein in its entirety.

TECHNICAL FIELD

The present disclosure generally relates to methods of and systems for protecting actuators and the assemblies they compose from overload conditions, and more particularly, to a system for providing overload protection to same, which employs magnetorheological fluid mechanisms connected in series with or parallel to the load acting upon the actuator, so as to effect tunable protection.

BACKGROUND

Many actuators, including active material actuators, are generally protected from mechanical overload by the use of mechanical springs or electrical-control schemes to avoid damage to the actuators when the output load exceeds a recommended limit. Both of these measures, however, present various concerns in the overload protection art. For example, it is appreciated that most conventional protectors provide a non-tunable, one-size-fits-all protective force that may be too resistive for some systems while too weak for others, and likewise for the same system over various stages of use/age, or conditions. Commonly, linear mechanical springs further tend to be bulky because of the conflicting requirements of high force threshold for the overload function necessary to enable normal operation, and low stiffness to restrict the maximum stress experienced by the actuator when the overload protection system is activated. Meanwhile, more versatile electrical/control schemes that rely on timing and/or feedback have been developed, but present concerns of their own, such as increased system costs.

SUMMARY

Examples of the present disclosure include an active material actuation system adapted for driving a load over an actuation cycle, and preventing an overload condition during the cycle. The system includes an actuator defining a maximum threshold force, and drivenly coupled to the load, so as to apply a driving force thereto. A fixed structure is coupled to the actuator. The system further includes an overload protector having a mechanism further including magnetorheological fluid defining a yield strength, and a translatable part disposed within the fluid, and at least one magnet communicatively coupled to the fluid, so as to further define the yield strength. The protector produces a selectively modifiable resistive force based on the yield strength, wherein the resistive force is less than the maximum threshold force, the mechanism being driven by the actuator such that the resistive force opposes the driving force, and caused to reconfigure, so as to create a secondary work output path, when the driving force is greater than the resistive force.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2a is a partial schematic elevation of an active material actuation system having a shape memory alloy wire actuator drivenly coupled to a load, and an overload protector including a magnetorheological fluid mechanism pivotally connected to the actuator parallel with the load and communicatively coupled to a permanent magnet, in accordance with a further example of the present disclosure;

FIG. 3 is a schematic elevation of an active material actuation system having a spooled shape memory alloy wire actuator drivenly coupled to a load, and an overload protector including a magnetorheological clutch interconnecting the actuator and load, and communicatively coupled to a magnet, in accordance with yet a further example of the present disclosure; and FIG. 3a is a schematic elevation of the system shown in FIG. 3, wherein an overloading condition exists, and the protector has been triggered to provide a secondary work output path for the system by disengaging the clutch.

DETAILED DESCRIPTION

Figure 1:
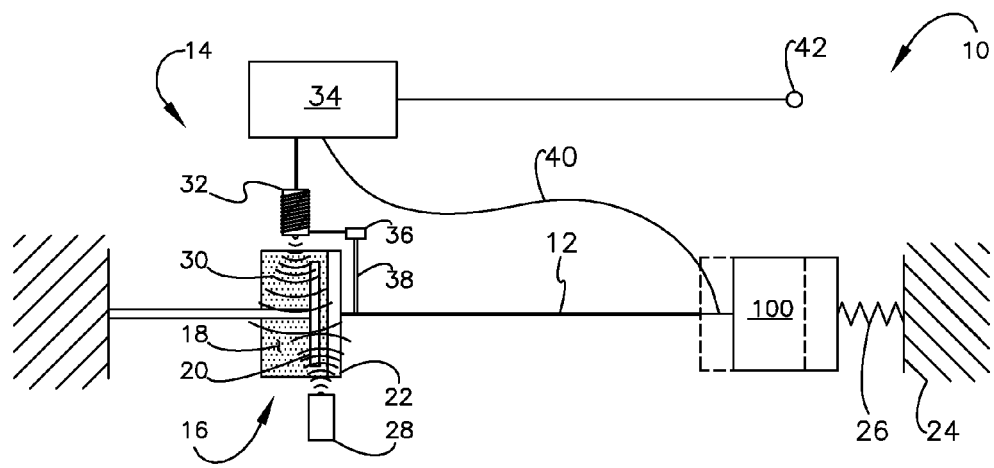
FIG. 1 is a schematic elevation of an active material actuation system having a shape memory alloy wire actuator drivenly coupled to a load, and an overload protector including a magnetorheological fluid mechanism connected in series with the load and communicatively coupled to electro and permanent magnets, in accordance with an example of the present disclosure.

Examples of the present disclosure concern systems for and methods of providing overload protection for actuators, most notably active material actuators, as well as the assemblies they compose. The system employs a magnetorheological fluid mechanism, such as a clutch, connected in series with or parallel to the load. Accordingly, the system is useful for offering tunable protection. The present disclosure is useful for preventing an overload condition, reducing the likelihood of damaging the actuator and/or assembly as a result thereof, and reducing the driving force necessary to overcome overload protection over the stroke of the actuator. That is to say, the present disclosure offers a secondary path for work output, when the system experiences a mechanical overload event, wherein a mechanical overload event is deemed to have occurred when the motion of the end of the actuator that is attached to the output load is restrained in a manner that requires significantly higher force for continued motion than is typical for the system or application. Mechanical jamming of the output load itself or of any component that mechanically couples the actuator to the output load is a typical example of a mechanical overload event. Under this circumstance, the force needed to break the system free of the jammed state can be significantly greater than the force required for normal operation of the system. This force may exceed the design force level for the actuator. For an actuation system where the power supplied to the actuator is turned off only when the actuator has completed its entire stroke, a mechanical overload event can cause the actuator to exceed its design force level, thereby potentially leading to permanent deterioration of the actuator performance.

Examples of the present disclosure are yet further useful for providing overload protection means that are permanently reusable, and in some examples autonomously resettable. That is to say by employing magnetism and magnetorheological fluid, the present disclosure presents a useful life far greater than those offered by conventional overload protectors subject to creep and fatigue. In some examples, the present disclosure offers tunable and selectively modifiable overload protection that takes into consideration load influencing conditions.

Thus, a first aspect of the present disclosure concerns an active material actuation system adapted for driving a load over an actuation cycle, and preventing an overload condition during the cycle. The system includes an actuator defining a maximum threshold force, and drivenly coupled to the load, so as to apply a driving force thereto, as well as the example overload protector. The overload protector includes a mechanism further including magnetorheological fluid defining a yield strength, a translatable part disposed within the fluid, and at least one magnet communicatively coupled to the fluid, so as to further define the yield strength. The overload protector produces a selectively modifiable resistive force based on the strength, wherein the resistive force is less than the maximum threshold force. The mechanism is driven by the actuator such that the resistive force opposes the driving force, and caused to reconfigure, so as to create a secondary work output path, when the driving force is greater than the resistive force.

Figure 2:
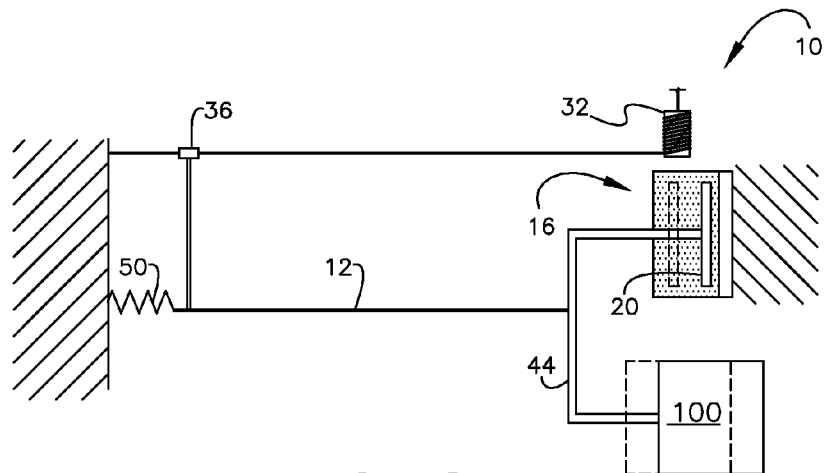
FIG. 2 is a schematic elevation of an active material actuation system having a shape memory alloy wire actuator drivenly coupled to a load, and an overload protector including a magnetorheological fluid mechanism connected to the actuator parallel with the load and communicatively coupled to an electromagnet, in accordance with another example of the present disclosure.

Referring now to FIGS. 1-3a, the present disclosure concerns a system 10 for, and method of protecting an actuator 12 from overload conditions during an actuation cycle. The system 10 includes a novel overload protector 14 including a magnetorheological fluid mechanism 16, such as a clutch, connected in series with or parallel to the load 100 driven by the actuator 12. That is to say, the disclosure broadly encompasses any overload protection device that utilizes magnetorheological fluid 18 to tune/modify the initial triggering or protective force. The mechanism 16 may be configured such that the fluid 18 variably engages plural parts 20,22, such as with respect to a clutch (FIG. 3), or offer a variable shear/pull through strength, such as with respect to a dashpot (FIGS. 1 and 2).

By implementation of the advantages herein described, the system 10 may be used to more reliably drive a load 100 in comparison to conventional actuators. Moreover, the instant disclosure may be used to mitigate and protect against overloading the driven structure, device, or assembly itself. Examples of the system 10 may be used in any application or environment where actuation is desired, but subject to the possibility of overloading, that does not interfere with magnetic performance. It is appreciated that a magnetic material presents a maximum operating temperature (i.e., "Curie temperature"), above which the material may become demagnetized. For example, the system 10 may be employed by a vehicle, e.g., to drive a power seat, power window, door latch, or other manipulable interior cabin feature (not shown).

The present disclosure may be used with any actuator, but may be particularly suited for use with active material actuators 12, and more particularly, to shape memory alloy (SMA) wire actuators due to their susceptibility to, and cyclic life degradation when exposed to overloading. As used herein the term "active material" shall be afforded its ordinary meaning as understood by those of ordinary skill in the art, and includes any material or composite that exhibits a reversible change in a fundamental (e.g., chemical or intrinsic physical) property, when exposed to an appropriate external signal source (e.g., electrical, magnetic, thermal and like fields). Suitable active materials for use with the present disclosure include shape memory materials, such as shape memory alloys, ceramics, and polymers, ferromagnetic SMA's, thin strips of piezoelectric uni- and bi-morphs, magnetostrictives, nanotube fibers, high-volume paraffin wax actuators, and electroactive polymer (EAP) diaphragms/tendons/roll actuators/etc. Shape memory materials generally refer to materials or compositions that have the ability to remember their original shape, which can subsequently be recalled by applying an external stimulus. As such, deformation from the original shape is a temporary condition. In this manner, shape memory materials can change to the trained shape in response to an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation.

Shape memory alloys exist in several different temperature-dependent phases. The most commonly utilized of these phases are the so-called Martensite and Austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials including shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this disclosure, it is appreciated that SMA's exhibit a modulus increase of approximately 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two-way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

With respect to the overload protector 14, suitable magnetorheological fluid materials include, but are not limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. An example of a magnetic-responsive particulate is carbonyl iron, such as, e.g., reduced carbonyl iron.

In an example, the particle size is selected so that the particles exhibit multi-domain characteristics when subjected to a magnetic field. Diameter sizes for the particles can be less than or equal to about 1,000 micrometers; or less than or equal to about 500 micrometers; or less than or equal to about 100 micrometers. Further, particle diameters can be greater than or equal to about 0.1 micrometer; or greater than or equal to about 0.5 micrometer; or greater than or equal to about 10 micrometers. In an example, the particles are present in an amount from about 5.0 percent by volume to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations including at least one of the foregoing fluids.

The viscosity of the carrier component can be less than or equal to about 100,000 centipoise; or less than or equal to about 10,000 centipoise; or less than or equal to about 1,000 centipoise. The viscosity can also be greater than or equal to about 1 centipoise; or greater than or equal to about 250 centipoise; or greater than or equal to about 500 centipoise.

Aqueous carrier fluids may also be used, especially those including hydrophilic mineral clays such as bentonite or hectorite. The aqueous carrier fluid may be water or water including a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid; or less than or equal to about 3.0%. Also, the amount of polar organic solvents is greater than or equal to about 0.1%; or greater than or equal to about 1.0% by volume of the total MR fluid. The pH of the aqueous carrier fluid is less than or equal to about 13; or less than or equal to about 9.0. Also, the pH of the aqueous carrier fluid is greater than or equal to about 5.0; or greater than or equal to about 8.0.

Natural or synthetic bentonite or hectorite may be used, wherein the amount of bentonite or hectorite in the MR fluid is less than or equal to about 10 percent by weight of the total MR fluid; or less than or equal to about 8.0 percent by weight; or less than or equal to about 6.0 percent by weight. In an example, the bentonite or hectorite may be present in greater than or equal to about 0.1 percent by weight; or greater than or equal to about 1.0 percent by weight; or greater than or equal to about 2.0 percent by weight of the total MR fluid.

Finally, optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Returning to the figures, the system 10 generally includes an actuator 12 defining a primary work output end 12a and a securing end 12b, and an overload protector 14 further including a magnetorheological fluid mechanism 16. The actuator 12 is drivenly coupled to a load 100 at the output end 12a, and configured to produce a driving force suitable to translate the load 100 under normal conditions. That is to say, where SMA wire is used, the actuator 12 presents a morphology, diameter, and length necessary to effect the needed driving force and stroke. Translation may be angular or linear, as further described below. The actuator 12 presents a suitable structural capacity based in part on characteristics, such as, for example, the maximum tensile strength of an SMA wire. As used herein, the term "wire" is non-limiting, and shall include other similar geometric configurations presenting tensile load strength/strain capabilities, such as cables, bundles, braids, ropes, strips, chains, springs, and other elements. For the purposes of the present disclosure, it is appreciated that the driving force increases as activation signal (e.g., thermal energy) is added to the system 10, until reaching the structural capacity. The actuator 12 is fixedly coupled to fixed structure 24 (e.g., the chassis of a vehicle) at the securing end 12b, so as to provide a base for generating and directing the driving force. Suitable structural, and electrically/thermally insulative or conductive means for interconnecting the actuator 12 and structure (or "base") 24, such as an O-ring crimp, are readily discernable by those of ordinary skill in the art and as such will not be further described herein.

The term "end" shall be used in a non-limiting sense, and shall encompass coupling the actuator 12 to the load 100 or fixed structure 24 at an interior point or along a surface. For example, where an SMA wire 12 presents a bowstring configuration, it is appreciated that the work output "end" is the intermediate vertex defined by the longitudinal profile of the wire 12. In an example, a biasing or return element 26 is intermediately coupled to the securing end 12b and protector 14, or coupled to the load 100 opposite the actuator 12 (FIG. 1). In the illustrated example, the return element 26 is configured to produce a biasing force that stretches the SMA wire 12 back to its pre-actuated, and, in an example, strained length, after overload protection is no longer needed. The biasing element 26 may be caused to store energy, for example, with a latch (not shown), when the wire 12 is deactivated, or may autonomously function to reset the system 10. Additionally, the mechanism 16 may contain a return element (e.g., a ferromagnetic SMA extension spring) 26 that drives it back to its pre-triggered state (FIG. 3).

As previously mentioned, an example of system 10 further includes an overload protector 14 that primarily employs a magnetorheological fluid mechanism 16 to effect overload protection. It is appreciated that the apparent viscosity and yield strength of MR fluid 18 is increased substantially (e.g., more than 50%) and, in an example, to a state of exhibiting viscoelastic behavior, when exposed to a magnetic field. As such, it is appreciated that under normal operation, a magnetic field may be left "ON" under normal operation to fix the secured end 12b of the actuator 12, and discontinued when an overload condition is sensed or anticipated algorithmically, so as to enable the secured end 12b to translate. In an example, the mechanism 16 is intermediate and serially coupled to the securing end 12b and fixed structure 24 (FIG. 1), though it could also be used intermediate the wire 12 and driven structure/device. As shown in FIG. 1, the mechanism 16 functions as a dashpot, producing a holding force that acts to retain the securing end 12b and structure 24 in a relatively fixed condition during normal operation. The holding force is produced by the resistance to the transfer of fluid 18 from one side of the moving part to the other side. Either the interior part 20 or exterior part 22 as illustrated may be caused to move with other being fixed. The holding force works antagonistic to the actuation/driving force, but is greater than the latter under normal anticipatory loads. Lastly, the holding force is less than ninety percent of the structural capacity of the wire 12 or driven assembly; or less than eighty percent of the structural capacity of the wire 12 or driven assembly. As a result, the mechanism 16 is configured to selectively allow relative motion between the structure 24 and actuator 12 when the driving force or stress acting upon the driven structure is greater than the holding force, which may result where an obstruction prevents normal operation. Thus, overload protection is provided where the load 100 is greater than anticipated, by providing a secondary work output path at the securing end 12b.

The mechanism 16 may be adjacently attached to the actuator 12 and/or structure 24, or spaced from either (through a cable, pulley system, extension rod, etc.) where necessary to effect the intended function of the disclosure (e.g., where the active material actuator 12 responds to a magnetic or thermal activation signal). In its simplest form, the mechanism 16 consists essentially of an engaging or translatable part 20, an engaged part 22, and a quantity of magnetorheological fluid 18 that modifies the force required to engage or relatively translate the parts 20,22 when activated and deactivated respectively (FIG. 1).

A permanent magnet 28 may be fixedly stationed proximate the mechanism 16, and oriented and configured to magnetically engage the fluid 18 with a suitable magnetic field 30. In another example, the permanent magnet 28 is removably stationed relative to the mechanism 16, so as to be replaced by another permanent magnet of differing strengths as desired. It is appreciated that the magnetically hard material that forms the magnet 28, as well as the dimensions of the magnet 28 are selected such that the magnetic field 30 is of sufficient strength to produce the necessary viscosity in the fluid 18. The necessary viscosity and therefore, holding force required, is based on the characteristics (e.g., structural capacities, delicacy, etc.) of the actuator 12 and driven assembly.

An example mechanism 16 is selectively adjustable, so as to provide a tunable system 10 that may be applied to multiple loads and variable conditions without disconnection and, in an example, in an autonomous manner. The example mechanism 16 is able to produce a plurality of holding forces depending upon the inherent and external/ambient conditions, life/usage of the actuator, application, etc. To that end, the mechanism 16 may include an electromagnet 32, as also shown in FIGS. 1 and 2. The electromagnet 32 presents the rating necessary to effect the prescribed behavior of the fluid 18. As such, in this configuration, the overload protector 14 further includes a suitable electric power source (e.g., the charging system of a vehicle in an automotive setting) communicatively coupled to the electromagnet 32, and a controller 34 intermediate the source and electromagnet 32. In an example, a ferromagnetic electromagnet 32, wherein a permanent magnet defines its core, may be employed to save power while maintaining tunability and reduce packaging requirements. It is appreciated that the strength of the magnetic field 30 produced by the electromagnet 32 is proportional to the current, and that therefore, the field 30 may be rapidly manipulated by controlling the amount of current delivered. In this example, an example of protector 14 further includes a variable resister (such as a potentiometer) connected in series with, so as to be operable to infinitely vary the current delivered to the electromagnet 32. It is appreciated that once the current is removed, a remanent magnetic field due to hysteresis remains within the core, which, in an example, is tracked and accounted for in subsequent applications by the controller 34. Alternatively, it is appreciated that a uniform external magnetic field may be produced by a pair of Helmholtz coils and employed for faster response.

The electromagnet 32 and/or permanent magnet 28 may be further configured to effect a baseline holding force, where engaging a mechanism 16 formed of ferrous material. Thus, in the present disclosure, the holding force may be produced by the viscosity/yield strength of the fluid 18 as it engages the translatable part 20, by the magnetic field 30 engaging the fluid 18 to change its viscosity/strength, and by the field 30 engaging the translatable part 20.

Figure 1A:
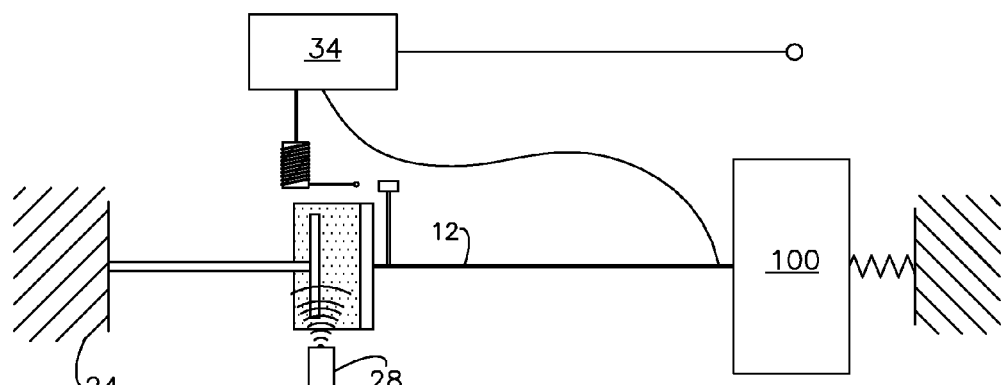
FIG. 1a is a schematic elevation of the system shown in FIG. 1, wherein an overloading condition exists, and the protector has been triggered to provide a secondary work output path for the system and deactivate the electromagnet.

As shown in FIGS. 1 and 2, a sliding switch 36 may be coupled to the translatable part 20 of the mechanism 16 through a connecting member 38, so as to complete the circuit 40 of the electromagnet 32. When overload protection is triggered, the switch 36 is caused to open, thereby deactivating the electromagnet 32 (FIG. 1a). When deactivated, the fluid 18 rapidly becomes more viscous making it easier for the members 20,22 to disengage. In an example, and as shown in FIG. 1, the connecting member 38 may be attached to the securing end 12b of the actuator 12. In this configuration, the member 38 is electrically conductive, and composes the circuit 40 along with the resistively heated portion of the actuator 12, such that opening the circuit 40 further terminates the activation signal. In FIG. 2, the connecting member 38 is attached to the securing end 12b of the wire 12, does not form part of the electromagnet circuit 40, and is therefore, in an example, electrically/thermally insulative.

An example of controller 34 is programmably configured to control activation of the actuator 12, so as to coordinate an increase or decrease in overload protection force, only when needed. To that end, an example of system 10 further includes a sensor 42 (FIG. 1) operable to detect a load influencing condition. The mechanism 16, controller 34 and sensor 42 are cooperatively configured to adjust the holding force responsive to the detected condition. Example conditions include the slope of the actuator 12 as it relates to gravitational influence upon the load 100. That is to say, the example system 10 may be configured to adjust the holding force as is necessary to effect overload protection, where, for example, a vehicle travels upon a sloped thoroughfare. It is appreciated that where the driving force acts against gravity, the load 100 will be greater than the anticipatory load horizontally limited to static and kinetic friction. The corresponding increase in holding force may be calculated based upon the trigonometric relationship of the weight contributing to the load 100. Other conditions include the acceleration or deceleration being experienced by the load 100, a vehicle event or vehicle event prediction, or the ambient temperature, atmospheric pressure, presence of lubrication, and/or surrounding fluid characteristics (e.g., laminar versus turbulent flow) that may affect the ability of the load 100 to be manipulated. For example, it is appreciated that a lubricated load 100 may be greater in relatively lower temperatures. In an example, the control algorithm includes a condition threshold, such that the controller 34 is configured to autonomously adjust the holding force only when the condition exceeds the threshold. For example, for slopes less than ten percent the influence of weight may be deemed negligible, such that modification of the holding force is withheld.

Alternatively, or in addition to one or more sensors 42, the global positioning system (GPS) or equivalent may be communicatively coupled to the mechanism 16 through the controller 34, and a receiver (not shown). In this configuration, GPS may be used to supply load influencing condition data. For example, GPS may be used to determine the geographic location of the actuator 12, and the slope of the actuator 12 at the location. In a vehicular application, the controller 34 and GPS may be employed to determine the location of the actuator 12 upon a thoroughfare, for example, and then used to determine the slope of the thoroughfare at the location (e.g., via a look up table, or calculations utilizing sequential points). The holding force may then be autonomously adjusted responsive to a slope that acts against the driving force.

In FIG. 2, the magnetorheological fluid mechanism 16 is connected in parallel to the load 100. In this configuration, the translatable part (e.g., the piston as illustrated) 20 and load 100 are contemporaneously driven by the actuator 12, such that the resistive force offered thereby and the load 100 cooperatively present an overall load on the actuator 12. As such, it is appreciated that during normal operation, both the translatable part 20 and load are caused to translate. The translatable part 20 and load 100 are fixedly interconnected, for example, via a cross-bar, truss, etc. 44, and may engage the actuator 12 at an equilibrium point, so as to result in purely linear motion (FIG. 2). In an example, to ensure displacement at the working end 12a of the wire 12 in parallel configurations, the mechanism 16 may be pivotally coupled to the load 100, actuator 12, and fixed structure 24, so as to define pivot joints 46 (FIG. 2a). Here, even if the load 100 remains obstructed/stationary, the mechanism 16 and interconnections 44 are able to swing to allow contraction at the working end 12a. A sliding collar 48 may be provided to enable this action. The MR fluid 18 housed within the mechanism 16 is selectively exposed to a magnet field 30, for example, by physically blocking its direct access, when more resistance is desired (e.g., during normal operation). In an example, and as shown, an electromagnet 32 may be employed to effect tunable resistance. As a result, when the load 100 presents an overload condition, the mechanism 16 may be adjusted to decrease the resistive force, so as to maintain the overall load.

The example system 10 is configured to autonomously reset the overload protector 14 when the overloading condition is no longer sensed. To that end, it is certainly within the ambit of the disclosure to utilize a two-way shape memory actuator 12 that re-engages the overload protector 14 upon cessation of the initial activation signal. As previously mentioned, a biasing or return element 26 may be included to drive the system 10, and in particular the protector 14, back to its pre-actuated or pre-triggered state.

The secondary element 50 may further serve as part of the overload protector 14. In FIG. 2, an extension spring 50 is fixedly connected to the stationary end 12b of the wire 12 and stretches when the driving force exceeds its spring modulus. When the spring 50 is caused to minimally (e.g., by 15%; or by 5%) stretch, such that the electromagnet 32 is deactivated through the switch 36, the normal resistive force of the mechanism 16 contributing to the overall load is reduced to mitigate and, in an example, eliminate the overload condition. It is a goal of the present disclosure to cooperatively correlate the load and mechanism 16 such that further displacement results at the working end 12a of the actuator 12 rather than by further stretching of the spring 50. That is to say, the mechanism 16 undergoes a drop in resistive force calculated to compensate for anticipatory overload conditions.

In FIGS. 3 and 3a, another example is depicted wherein the mechanism 16 acts as a clutch composing an axle 52. The axle 52 may be supported by roller bearings (not shown) to reduce friction. The mechanism 16 is configured to transfer an angular actuating force to the load 10 through selective engagement between the two parts (e.g., clutch disc, and flywheel) 20,22. In this configuration, the fluid 18 viscosity acts as the holding force that keeps the parts 20,22 engaged, and the mechanism 16 acts in a binary fashion. As illustrated, the actuator 12 may be a spooled SMA wire having its stationary end 12b directly coupled to the translatable part 20, and the opposite end attached to the axle 52. Alternatively, the wire 12 may be coupled to the disc 20 through a release fork or other leveraging device (not shown) as is conventionally provided. The more the fluid 18 is viscous, the more relative motion between the parts 20,22 is deterred. When the resistance to motion between the parts 20,22 exceeds the load 100, contraction is caused to occur at the working end 12a of the wire 12. This, in turn, causes the axle 52 to transfer the angular force to the load 100. However, when the actuating force applied at the translatable part 20 overcomes the fluid's resistance (e.g., angular motion is prevented due to overloading), such that it is caused to axially translate, the wire 12 acts to disengage the clutch 16, thereby freeing the portion of the axle 52 not connected to the overload to rotate (FIG. 3a). In this condition, it is appreciated that surface friction between the fluid 18 and disc 20 will produce a force resistive to rotation, but substantially less than that required for axial translation. Again, an electromagnet 32 may be used to alter one or more of the resistive forces offered by the fluid 18. Again, it is appreciated that return springs (also not shown) may be used to reengage the parts 20,22 and counter-rotate the axle 52, so as to re-spool the wire 12, upon the cessation of the overload condition.

It is to be understood that "combination" is inclusive of blends, mixtures, alloys, reaction products, and the like. Furthermore, the terms "first," "second," and the like herein do not denote any order, quantity, or importance, but rather are used to distinguish one element from another. Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Suitable algorithms, processing capability, and sensor inputs are well within the skill of those in the art in view of this disclosure.

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 5.0 percent by volume to about 50 percent by volume should be interpreted to include not only the explicitly recited limits of about 5.0 percent by volume and about 50 percent by volume, but also to include individual values, such as 8.5 percent by volume, 32 percent by volume etc., and sub-ranges, such as from about 12 percent by volume to about 40 percent by volume, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. An active material actuation system adapted for driving a load over an actuation cycle, and preventing an overload condition during the cycle, the system comprising:
   an actuator defining a maximum threshold force, and drivenly coupled to the load, so as to apply a driving force thereto;
   a fixed structure coupled to the actuator; and
   an overload protector, including:
      a mechanism further including magnetorheological fluid defining a yield strength, and a translatable part disposed within the fluid; and
      at least one magnet communicatively coupled to the fluid, so as to further define the yield strength, the protector producing a selectively modifiable resistive force based on the yield strength, wherein the resistive force is less than the maximum threshold force, the mechanism being driven by the actuator such that the resistive force opposes the driving force, and caused to reconfigure, so as to create a secondary work output path, when the driving force is greater than the resistive force.

2. The system as defined in claim 1 wherein the actuator is an active material actuator operable to undergo a reversible transformation in fundament property when exposed to or occluded from an activation signal, having a work output end and a securing end.

3. The system as defined in claim 2 wherein the actuator is a shape memory alloy wire.

4. The system as defined in claim 1 wherein the at least one magnet includes an electromagnet configured to selectively produce and/or modify a magnetic field.

5. The system as defined in claim 4 wherein the electromagnet is a ferromagnetic electromagnet.

6. The system as defined in claim 4 wherein the electromagnet composes a circuit, and the actuator is configured to open the circuit, so as to deactivate the electromagnet, when the driving force is greater than the resistive force.

7. The system as defined in claim 6 wherein the circuit further comprises a switch, and the actuator is drivenly coupled to the switch.

8. The system as defined in claim 7 wherein the circuit further comprises the actuator.

9. The system as defined in claim 1 wherein the mechanism is connected to the actuator serially with the load.

10. The system as defined in claim 1 wherein the mechanism is connected to the actuator parallel to the load, such that the load and mechanism cooperatively define a modifiable overall load.

11. The system as defined in claim 10 wherein the mechanism, load, and actuator are interconnected by at least one pivot joint.

12. The system as defined in claim 10 wherein the actuator is connected to the mechanism and load at an equilibrium point, so as to produce only linear motion.

13. The system as defined in claim 10 wherein the protector further includes an extension spring intermediate the actuator and fixed structure.

14. The system as defined in claim 1 wherein the actuator applies an angular driving force to the load, and the mechanism defines a clutch.

15. The system as defined in claim 14 wherein the translatable part is a clutch disc, and the mechanism further includes a flywheel selectively engaged by the disc.

16. The system as defined in claim 1, further comprising a return element drivenly coupled to the actuator and operable to produce a biasing force to the mechanism, so as to return the protector to a pre-actuated state.

17. The system as defined in claim 1, further comprising a sensor operable to detect a load influencing condition, and communicatively coupled to the mechanism, the mechanism being configured to produce the resistive force in response to the condition.

18. The system as defined in claim 17 wherein the condition is selected from the group consisting of the slope of the actuator, the acceleration or deceleration of the load, the ambient temperature, atmospheric pressure, lubrication presence, the application, and surrounding fluid, ice, or particulate matter characteristics.

19. The system as defined in claim 17, further comprising a controller communicatively coupled to and intermediate the sensor and mechanism, and having stored thereupon a condition threshold, the controller, sensor, and mechanism being cooperatively configured to autonomously adjust the holding force only when the condition exceeds the threshold.

20. The system as defined in claim 1 wherein the mechanism is formed of ferrous material communicatively coupled to the magnet, and the resistive force is further produced as a result thereof.

* * * * *